Jan. 19, 1965 R. E. McLEAN 3,165,830
CAN OPENER
Filed March 4, 1963 4 Sheets-Sheet 1

INVENTOR.
Robert E. McLean
BY
Scofield, Kokjer, Scofield & Lowe
ATTORNEYS.

Jan. 19, 1965   R. E. McLEAN   3,165,830
CAN OPENER

Filed March 4, 1963   4 Sheets-Sheet 2

INVENTOR.
Robert E. McLean
BY
Scofield, Kokjer, Scofield & Lowe
ATTORNEYS.

Jan. 19, 1965 R. E. McLEAN 3,165,830
CAN OPENER

Filed March 4, 1963 4 Sheets-Sheet 3

INVENTOR.
Robert E. McLean
BY
Scofield, Kokjer, Scofield & Lowe
ATTORNEYS.

Jan. 19, 1965  R. E. McLEAN  3,165,830
CAN OPENER
Filed March 4, 1963  4 Sheets-Sheet 4

INVENTOR.
Robert E. McLean
BY
Scofield, Kokjer, Scofield & Lowe
ATTORNEYS.

United States Patent Office 3,165,830
Patented Jan. 19, 1965

3,165,830
CAN OPENER
Robert E. McLean, Raytown, Mo., assignor, by mesne assignments, to Rival Manufacturing Company, Kansas City, Mo., a corporation of Missouri
Filed Mar. 4, 1963, Ser. No. 262,532
13 Claims. (Cl. 30—9)

This invention deals generally with can openers and refers more particularly to improvements in the cutter wheel support, feed wheel actuating mechanism and coaction between the cutter wheel and feed wheel, especially with reference to can openers of so-called "single action" type, that is the type wherein all of the operational steps necessary for opening the can are performed by rotation in selected directions of a single operating handle.

In my prior Patent 2,600,792 issued June 17, 1952, there is disclosed generally a can opener of the single action type wherein the displacement of the feed wheel between the open can receiving position and closed cutting position relative the cutter member is effected as the result of thrust obtained by coaction between a feed wheel drive member and a pawl. One object of the present invention is to provide an improved thrust mechanism which is positive in operation, which permits all the manipulative steps of the operating handle with little effort and which is remarkably quiet during cutting. In my invention, the thrust mechanism incorporates an unique pawl, movable in a plane parallel with the side of the can opener body, (1) for automatically interlocking with the feed wheel drive means to effect shifting of the feed wheel toward the cutter to cause piercing of the can upon rotation in one direction, (2) for effecting automatic disconnection between the pawl and feed wheel drive means as rotation in said one direction continues after the feed wheel has reached the can cutting position, and (3) for automatically reinterlocking with the feed wheel drive means upon reverse rotation of the latter to again cause separation of the feed wheel from the cutter to permit removal of the can.

Another object of the invention is to provide a pivotal support member for the can feed wheel and all parts mounted on the same shaft therewith, including the operating handle and elements of the thrust mechanism cooperating with the aforementioned pawl, which serves to maintain the axis of the can feed wheel and said parts in exceptionally good alignment at all times and thereby not only improve the efficiency of the can opener but also minimize friction between operating parts to provide easier operation and longer life of the device. Can openers with the can feed wheel mounted on a support member that, in turn, is pivoted to the body of the can opener, are shown in my prior U.S. Patents Nos. 2,591,181, issued April 1, 1952; 2,592,933, issued April 15, 1952; and 2,592,935, issued April 15, 1952; and also in U.S. Patent No. 2,020,580, issued November 12, 1935, to Schoenberger. However, in contrast to these previously disclosed devices, the pivotal can feed wheel support member in my invention is sturdily anchored to move in a fixed arcuate path by supporting it on both sides of the support member and eliminating any likelihood of twist or deflection under great stress thereby attaining the stated objectives.

Yet another, and highly important, object of the invention is to provide, in a can opener in which the rim or flange of the can is resiliently vertically squeezed between the toothed periphery of the can feed wheel and the groove of the overlying cutter wheel, a novel cutter wheel carrier assembly which improves greatly the efficiency of the can opener and also provides for easier operation and longer life of the device. This object is achieved in part by providing a floating cutter carrier assembly which is mounted to the body of the can opener in such manner that there is a minimum of friction between the assembly and body, thus permitting limited vertical and lateral movement of the cutter wheel, against pressure exerted by strategically located springs, relative to the cooperating portions of the feed wheel during the cutting operation.

Still another object of the invention is to provide a can opener of the character described in which by novel positioning of the cutter wheel relative to the feed wheel the can requires a minimum of external support by can guides and the like in order to maintain it in the most efficient position for cutting. A related object is to provide a can opener construction in which improved and substantially uniform cutting is obtained through an extremely wide range of can sizes and shapes. By improving the cutting efficiency, not only is the cut made cleaner but the operation requires less effort on the part of the user and wear on the component parts of the can opener is greatly reduced from that occurring in current units.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views.

Figure 1:
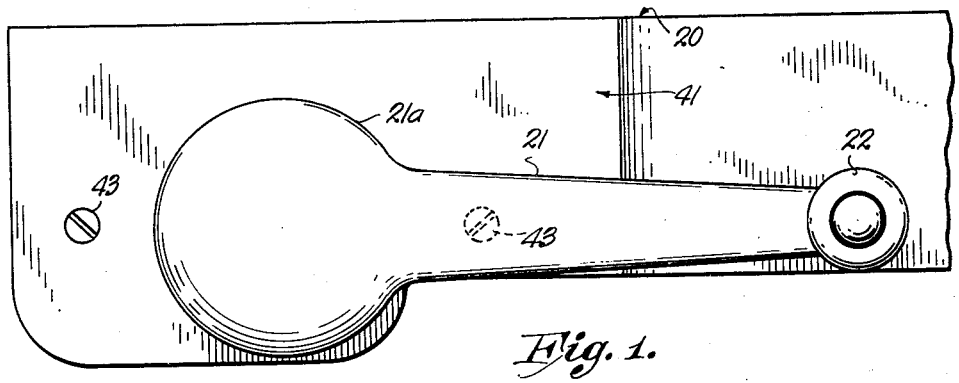
FIG. 1 is a fragmentary side elevational view of a can opener embodying the invention.
Figure 2:
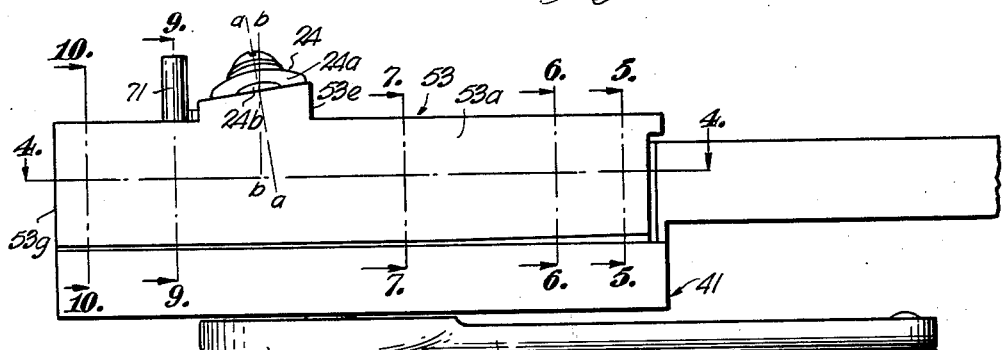
FIG. 2 is a fragmentary top plan view of the can opener.
Figure 3:
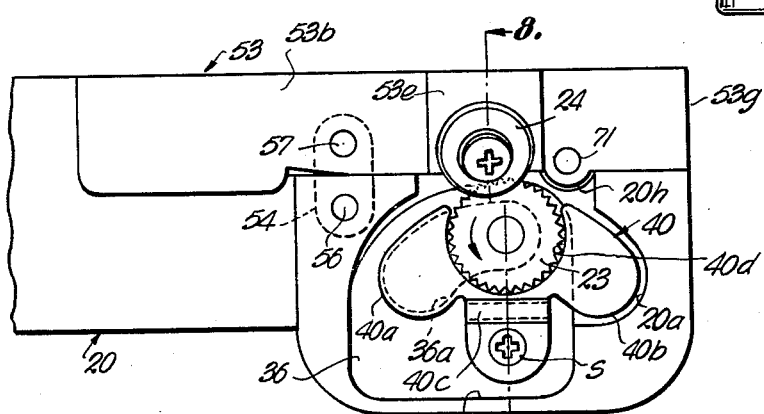
FIG. 3 is a fragmentary side elevational view of the side of the can opener opposite that shown in FIG. 1, the feed wheel being illustrated in its cutting position relative to the cutter member.

Referring now to the drawings and initially to FIGS. 1–3 inclusive, reference numeral 20 indicates generally an elongate body which comprises the main support structure for the can opener and its operating mechanism. The body may be cast or otherwise formed from suitable materials such as aluminum or steel and may be supplied with the usual wall-mounting bracket (not shown). Through mechanism later to be described, the can opener is operated through selective rotation of the single operating crank 21, which has the enlarged hub portion 21a at one end and the swiveled hand knob 22 at the other. The crank hub 21a is drivingly connected with the serrated or toothed feed wheel 23 located on the opposite side of the can opener (FIG. 3). The feed wheel is adapted to cooperate with a cutter member in the form of a cutter wheel 24 in the piercing of a can lid and subsequent cutting of the lid from the can. As the description proceeds, it is important to bear in mind at all times that all operations of the can opener of the present invention are performed through manipulation of the single operating crank 21.

Figure 4:
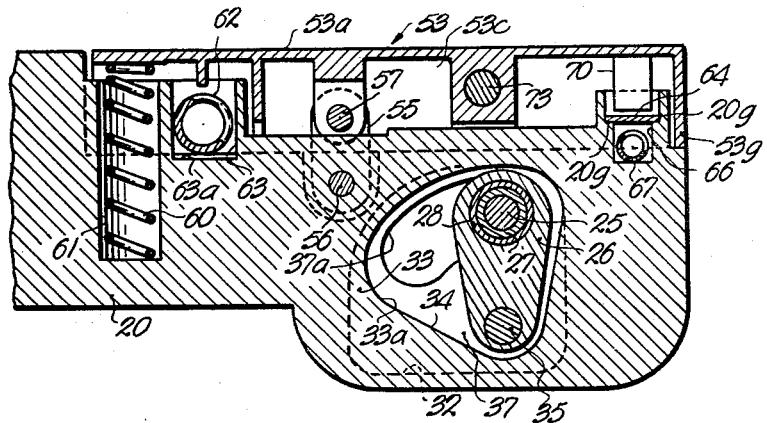
FIG. 4 is a fragmentary sectional view taken generally along the line 4—4 of FIG. 2 in the direction of the arrows.
Figure 5:
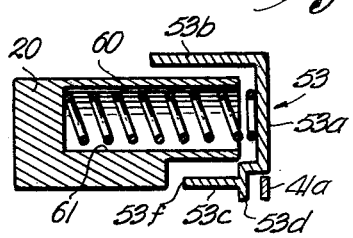
FIG. 5 is a fragmentary partial section taken generally along line 5—5 of FIG. 2 in the direction of the arrows, only a portion of the side cover member being shown.
Figure 6:
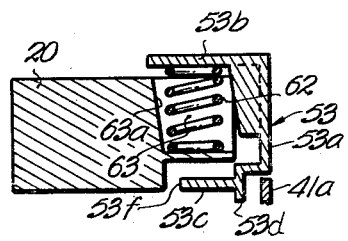
FIG. 6 is a fragmentary partial section taken generally along line 6—6 of FIG. 2 in the direction of the arrows, only a portion of the side cover member being shown.
Figure 8:
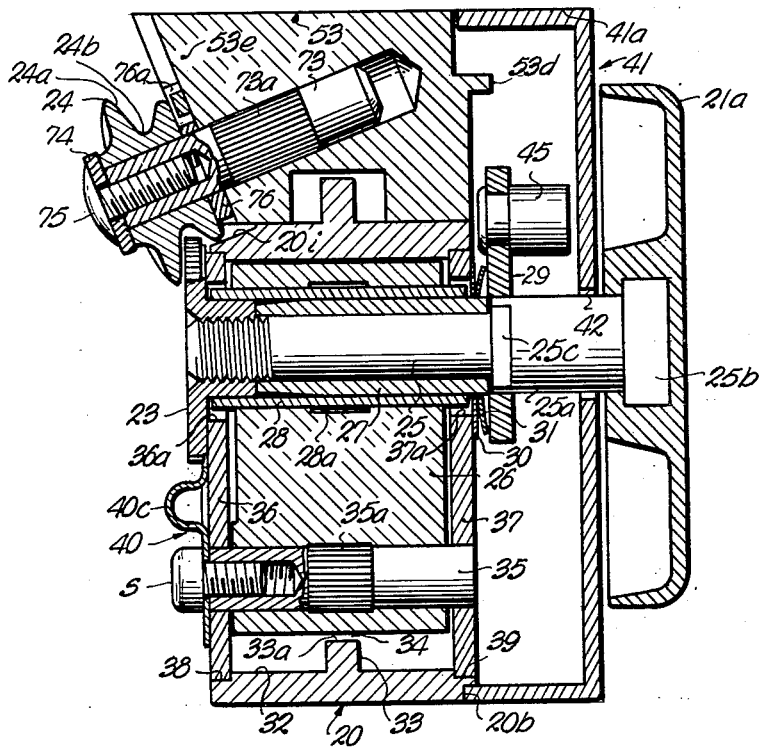
FIG. 8 is a greatly enlarged sectional view taken along the line 8—8 of FIG. 3 in the direction of the arrows.
Figure 14:
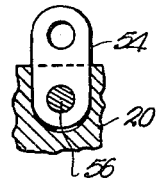
FIG. 14 is a fragmentary sectional view taken generally along line 14—14 of FIG. 13 in the direction of the arrows.
Figure 15:
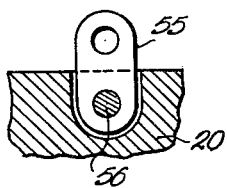
FIG. 15 is a fragmentary sectional detail taken along line 15—15 of FIG. 13 in the direction of the arrows.

Referring now to FIGS 3, 4 and 8, the feed wheel 23 is threadedly secured to one end of a feed wheel shaft having two sections, namely, the main section 25 and the larger diameter section 25a. The latter section terminates in a polygonal head 25b which is cast in and thus firmly secured to the crank hub 21a.

The feed wheel shaft is supported for lateral arcuate movement toward and away from the cutter wheel 24 by means of a relatively massive pivotal link member 26. Section 25 of the feed wheel shaft has mounted thereon a spacer sleeve 27 which in turn is journaled in a bearing 28 carried in an opening through the link 26. Bearing 28 is knurled as at 28a and preferably is cast integral with the linke member 26 at the time of manufacture of the latter. The outer surface of sleeve 27 tapers slightly at that end toward the feed wheel; this is provided for alignment purposes.

For a reason to be subsequently explained in greater detail, the enlarged portion 25a of the feed wheel shaft carries a crank arm 29 (see FIG. 11) which is connected with the section 25a by interengagement between the parallel sides of an opening 29a in the crank arm with parallel flats 25c formed on the feed wheel shaft. The width of the flats in the direction parallel with the shaft axis is slightly less than the thickness of the crank arm (FIG. 8). Thus, when the feed wheel is tightened down on its threads, the crank arm 29 will be seated by sleeve 27 firmly against the shoulders at the sides of the flats and the feed wheel, sleeve, crank arm and shaft will all be secured together in a unitary structure with the hub 21a.

It will be noted that interposed between the cover plate 37 and the crank arm 29 and surrounding sleeve 27 are a flat washer 30 and a curved spring washer 31. As will subsequently be seen, the spring washer 31 assists in maintaining the feed wheel in a stable position and also in maintaining certain other parts in proper relationship.

The link member 26 is mounted within a relatively large opening in the forward end of the main body 20, which opening is defined generally by the surface 32. Substantially at the mid-point of this opening in the direction of the thickness of the body is a strengthening rib 33 having the edge 33a, defining a generally sector shaped aperture 34 within which the link member 26 is free to move.

The link member 26 carries near its lower end a pivot pin 35 which as in the case of bearing 28, is preferably cast as a part of the link member during the manufacture of the latter. The pin is knurled as at 35a and projects from the opposite sides of the link member. The ends of the pin are journaled in suitable apertures in parallel plate members 36 and 37 respectively, which are disposed on opposites sides of the main body and serve to close the body opening in which the link is mounted.

As shown in FIG. 8, the outer faces of plates 36 and 37 are flush with the corresponding side surfaces of the body 20, being seated at their edges in rabbeted recesses 38, 39 in the latter. Each plate is provided with an arcuate clearance slot 36a, 37a adapted to freely receive the protruding ends of the feed wheel bearing 28. The slots 36a, 37a are formed as a circular arcuate segment with the axis of link pin 35 as the center. To prevent intrusion of foreign matter, the slot 36a which is on that side of the unit toward the cutter wheel is at all times in the movement of link 26 from one end of the slot to the other, covered by the opposite lobes 40a, 40b of a thin plate member 40 which is secured to the pin 35 by the cap screw S. An outwardly projecting pleat or fold 40c is formed on plate 40 below the can feed wheel. As will subsequently be seen, this serves as a can guard operable to engage the side of a can and assist in maintaining the can axis in the proper orientation for cutting. The upper portion of member 40 is cut away as at 40d so as to avoid interference with the teeth of the feed wheel the edge of cut-away 40d partially surrounding and spaced from the path of the feed wheel teeth. As best seen in FIG. 3, lobe 40b is received in a similarly shaped, shallow, relieved depression formed in the near face of the body and having the edge 20a.

Figure 11:
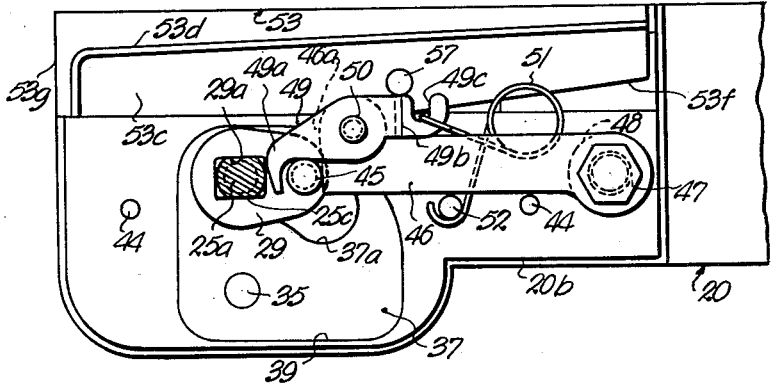
FIG. 11 is a side elevational view of the can opener looking at the same side as in FIG. 1, but with the operating handle and adjacent side cover removed, the internal mechanism being shown in positions corresponding to the position of the feed wheel illustrated in FIG. 3.
Figure 12:
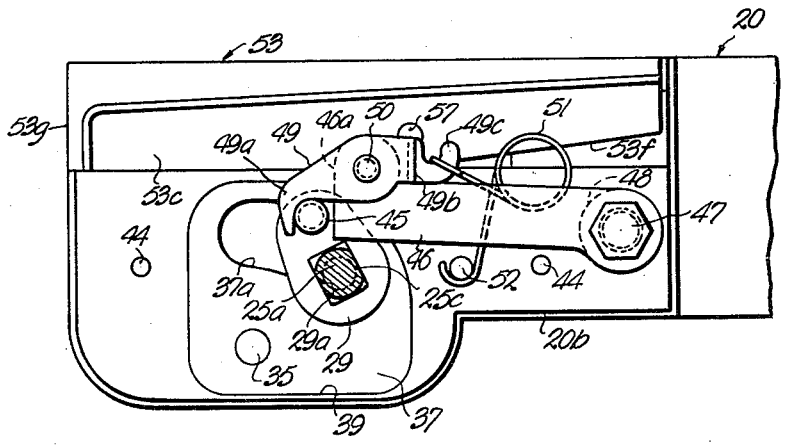
FIG. 12 is a view similar to FIG. 11 but showing the internal mechanism in position corresponding to maximum separation of the feed wheel from the cutter, which position is in correspondence with the handle and feed wheel position of FIGS. 1 and 2.
Figure 13:
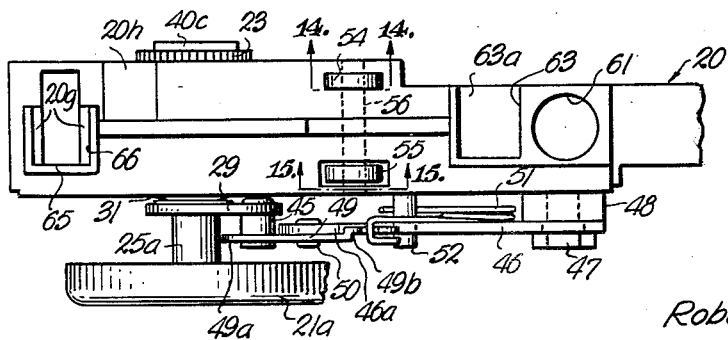
FIG. 13 is a fragmentary top plan view of the can opener, the top cutter carrier member, the side cover, operating handle knob, and all springs being removed, the pawl and associated mechanisms being shown in positions corresponding to those of FIG. 11.

Continuing with the description of the feed wheel operating and control mechanism and returning to FIGS. 1, 2 and 8 and in addition FIGS. 11, 12 and 13, we have previously seen that the feed wheel shaft has connected for rotation therewith the short crank arm 29. This crank arm, as well as the parts which cooperate therewith, are concealed behind an outer, dished side cover 41 which has the general outline of the body 20 at the cutter end of the unit. The side cover 41 is apertured at 42 to receive freely therethrough the feed wheel shaft section 25a. The edges of the rim of cover 41 seat in a rabbeted recess 20b extending partly around the operating mechanism. The cover 41 is removeably secured in place by screws 43 (FIG. 1) which are received in tapped apertures 44 in the adjacent face of the main body 20 (FIG. 11).

The free end of crank arm 29 carries a pin 45 which extends to one side thereof. The pin 45 is preferably in the form of a headless shoulder rivet and is hotheaded into the crank arm.

Adapted to cooperate with the crank arm 29 is a pawl assembly which includes the main pawl member 46, which member is pivotally mounted to main body 20 by a shoulder screw 47. The shank of this screw is received in a suitably tapped aperture formed in a circular boss 48 extending from the adjacent side face of the body 20. The main pawl member 46 carries at its free end the auxiliary pawl 49, the latter being pivoted to pawl member 46 by a shoulder rivet 50 which is anchored in an upstanding ear 46a on the pawl member. The auxiliary pawl has detent 49a which, under circumstances later to be described, cooperates with crank arm pin 45 to effect movement of the link 26 and corresponding movement of the feed wheel into and out of cutting relationship with the cutter wheel in response to selective rotation of the main operating crank 21.

It will be noted that the auxiliary pawl 49 has the inset portion 49b which is oriented to overlie and provide a stop surface which engages the upper edge of main pawl member 46 to limit the permissible clockwise rotation of the auxiliary pawl relative its main pawl member 46. The auxiliary pawl is resiliently urged at all times in a clockwise direction about its pivot by a torsion spring 51. Spring 51 has one end engaged in a notch 49c in the auxiliary pawl and the other against a pin 52 fitted into and projecting from the face of the main body 20. As earlier suggested, the bias of spring 51 is such that its two free ends tend to close toward one another. Thus, the spring not only urges the auxiliary pawl to a position in which the detent 49a is extended and the offset portion seated on the main pawl member 46, but also the entire pawl assembly is urged counter-clockwise about the axis of screw 47 and toward a position in which the under edge of the main pawl member 46 is seated on pin 52.

As earlier suggested, the cutter member for the unit is not rigidly supported from the main body 20, but instead is carried by a cutter carrier member which is generally identified by reference numeral 53 and which, as will be seen, has certain characteristics of limited movement. This carrier member has the top wall 53a generally flush with the top surface 41a of side cover 41, the depending front wall 53b parallel with the side of the body 20 and a rear wall 54c (FIGS. 5–10 inclusive) having a projecting strengthening rib 53d. The cutter wheel 24 is supported from a boss 53e on the front wall, the details as to which will be supplied shortly.

The principal connection between the cutter carrier member 53 and main body 20 includes a pair of spaced vertical links 54 and 55 which extend partially into upright recesses formed in the top of main body 20 and are anchored therein at their lower ends by a cross pin 56 extending transversely through registering passages in the body and openings in the links. The connection of link 54 with the main body is rigid, the body recess for link 54 closely conforming in cross-section to the cross-section of the link. On the other hand, the link 55 is positioned in a recess slightly larger in cross-sectional area than the cross-section of the link and thus has a certain degree of permissible limited pivotal movement about the axis of pin 56. The upper ends of links 54 and 55 are apertured and are jointed to the carrier member by a cross pin 57 which extends through aligned openings in the links and through similar openings in side walls 53b, 53c and ears 58 and 59 associated with each link and depending from the inside of top wall 53a of the carrier member.

As best seen in FIGS. 5, 6, 11 and 12, the lower edge of the rear wall 53c of the carrier member is relieved as at 53f toward the back end of the can opener. Because of this and because of the pivotal mounting of the carrier member to the main body on the horizontal axis defined by pin 57, the carrier member is capable of limited counter-clockwise pivoting about pin 57 from the position shown in FIGS. 3 and 4, or stated otherwise, clockwise pivoting as viewed in FIGS. 11 and 12. The carrier member is urged toward the position of these figures by compression spring 60 contained under suitable initial compression in a cylindrical recess 61 formed in the main body 20, the spring bearing at its upper end against the inside of top wall 53a of the carrier member. Interference between the lower edge of the end wall 53g of the carrier and an abutting horizontal surface on the main body keeps the carrier member stabilized against the pressure of the spring in a position in which pins 56 and 57 are normally vertically aligned with their axes in a common plane when no can is present.

Figure 7:
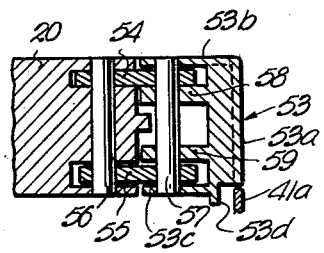
FIG. 7 is a fragmentary partial section taken along the line 7—7 of FIG. 2 in the direction of the arrows, only a portion of the side cover member being shown.

By referring to FIGS. 4, 7 and 13, it will be seen that link 54 (the one rigidly anchored in the body) also provides a form of fulcrum defining a vertical axis about which a limited rotation of the carrier member 53 can take place. Both openings in link 55 are made somewhat larger than the respective pins 56 and 57, as is the outer opening in link 54, through which pin 57 extends, so as to permit the necessary degree of movement. The horizontal compression spring 62 (FIGS. 4 and 6) is contained in a cavity 63 in the main body. It will be noted that the bottom 63a of cavity 63 is relieved toward the front of the can opener so that spring 62 can flex somewhat in a lateral direction during operation. The spring 62 serves to urge the carrier member forwardly in a direction to seat the side of ear 58 against link 54. By referring to FIG. 7, it will be seen that clearance has been provided between all mating parts as needed to assure that the ear can always so seat.

Figure 10:
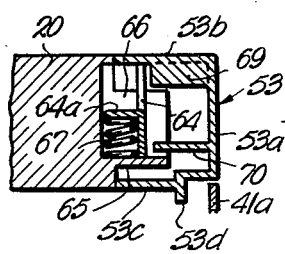
FIG. 10 is a fragmentary sectional view taken along the line 10—10 of FIG. 2 in the direction of the arrows, only a portion of the side cover member being shown.

The action of the spring 62 tending to twist the carrier in a horizontal plane about link 54 is resisted by means shown in FIG. 10. A stop link 64 is interposed between the inside of the front wall 53b of the carrier member and a partition 65 formed on the main body. Under normal conditions, with no can in the opener, the respective ends of link 64 are in contact with the adjacent wall surfaces as shown in FIG. 10.

Figure 16:
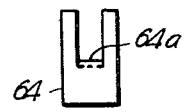
FIG. 16 is a detail showing the horizontal link component of FIG. 10.
Figure 17:
FIG. 17 is a view looking down on the component of FIG. 16.

A detailed showing of the construction of stop link 64 is made in FIGS. 16 and 17. The link comprises a rectangular piece from which has been struck and downwardly bent a central tang 64a. The link is mounted in a socket-like recess 66 in the main body, the end of which is defined by the partition 65. On either side of the tang, the link rests on parallel ways 20g (FIGS. 4 and 13). A light compression spring 67 is located in socket 66 and the tang 64a extends into the socket to be engaged by one end of said spring. The other end of the spring bears against the partition 65.

Although action of the spring 67 will always tend to rotate the link 64 clockwise (when viewed as in FIG. 10) or in a direction such that its right end should always seat downwardly on the ways 20g and its left end should always seat upwardly against the overlying rib 69 of the cutter carrier, it will be seen that the rib 69, together with the lug 70 depending from the inside top wall of the carrier member, will assure that the link 64 will always be in operational position and the link will always be positively returned to the desired position when the cutter carrier 53 returns to its normal position.

Figure 9:
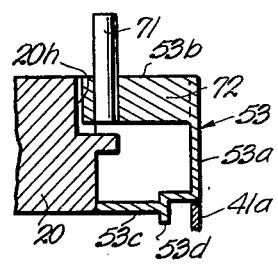
FIG. 9 is a fragmentary sectional view taken along the line 9—9 of FIG. 2 in the direction of the arrows.

A can guide 71 in the form of a rod or pin projects forwardly from the front wall 53b of the carrier member as seen in FIGS. 2, 3 and 9. This can guide is preferably press-fitted into a suitable aperture in a thickened portion 72 of the front wall of the carrier member. It is so located that with the can feed wheel in the raised position as shown in FIG. 3, the lower edge of the can guide lies in a horizontal plane spaced above another horizontal plane containing the uppermost teeth of the feed wheel a distance approximately equal to the height of an average can bead or flange. The main body 20 is cut away as at 20h so that there will be no interference between the thickened wall portion 72 and main body during operation.

As earlier noted, the cutter wheel 24 is supported from the boss 53e on the carrier member 53. The boss is provided with a recess into which is press-fitted the arbor or stud 73. The inserted portion of the stud is preferably knurled as at 73a. The cutter wheel is rotatably journaled on the stud and is retained thereon by washer 74 and screw 75, the latter extending into a correspondingly threaded axial recess in the outer end of the stud. A special washer 76 may be interposed between the cutter wheel 24 and face of boss 53e. The lower portion of this washer is circular; however, there is an upstanding upper portion that is bifurcated as at 76a to straddle a small locating boss formed as a part of the boss 53e (FIG. 8) to prevent rotation of the washer on stud 73. A conventionally forked magnet supporting arm (not shown) can be installed on this washer 76 in the usual manner. Since washer 76 and the magnet structure play no part in the present invention, no further description will be provided. I simply note that the can opener can readily be provided with the conventional magnetic lid holding structure.

It will be noted that the axis of the cutter wheel stud 73 is inclined with respect to the axis of the feed wheel shaft, both horizontally and vertically. For purposes of illustration of the angle, the face of the boss 53e has been shown as being normal to the cutter wheel axis, although this obviously is not essential to the invention. The horizontal component of the inclination is best observed in FIG. 2, where line b—b represents the feed wheel axis and a—a the cutter wheel axis. The vertical component can be seen in FIG. 8. Moreover, the positioning of the cutter wheel is such that the lowermost point on its cutting edge is offset laterally from the uppermost point on the periphery of the feed wheel when the latter is in the raised or cutting position (FIG. 3), the direction of offset being in the direction of advance of the uncut can lid, which is the direction conforming to the arrow in FIG. 3 representing direction of the feed wheel rotation. More will be said of this later.

As best seen in FIG. 8, the cutter wheel has the conical inner face 24a, the angularity of the face being such that it substantially parallels the face of the feed wheel where the two confront one another. It also includes the groove 24b, the base of which bears against the upper edge of the can flange (not shown) to seat the lower edge of the flange on the feed wheel teeth in the usual fashion. Main body 20 is relieved as at 20i so as to provide adequate clearance for the cutter wheel and to assure against binding during operation.

Operation

In preparing the unit for opening of a can, if the single operating crank 21 is not in its extreme counterclockwise position (as viewed in FIG. 1), it is first rotated to such position. Normally, the crank will be in its extreme counterclockwise position upon completion of the operation of opening a can, as will be seen. The corresponding can feed wheel position will be, as viewed in FIG. 3, to the left of and below the illustrated position, that is toward the opposite end of slot 36a. In this position, the teeth of the feed wheel are sufficiently below the cutter wheel as to permit the seating of a can flange on the uppermost part of the feed wheel. The position of the feed wheel shaft at this time is shown in FIG. 12.

The can is inserted in the position described and held with its upper end or top in position to seat against the edge of the cutting wheel as the operating crank 21 is rotated clockwise (as viewed in FIG. 1). As will be seen, upon such initial clockwise rotation, the can is lifted against the cutter wheel and forced on up to cause piercing of the can top. Thereafter, continued clockwise turning of the crank serves to advance the can in respect to the cutter wheel as necessary to cut the top completely from the can. It is not necessary for the user to continue holding the can after approximately the initial one-quarter clockwise rotation of crank 21. After the lid or end has been cut from the can, the user again grasps the can while he rotates the crank 21 counterclockwise to the FIG. 1 position as described above. This in general constitutes the over-all operation of the unit.

During approximately the initial three-eights clockwise rotation of the crank 21 from the open or FIG. 1 position, the pawl 46 and all cooperating parts as shown in FIGS. 11 and 12 will be moved from the position shown in FIG. 12 to the positions shown in FIG. 11. By observing the positions of shaft 25a in FIGS. 11 and 12 and knowing that the can feed wheel 23 is carried on the far end of the shaft, it will be seen that the can feed wheel 23 as it is being rotated counterclockwise (as viewed in FIG. 3) is positively moved by action of the pawl 46, pin 45 and crank 29 from its rearwardmost and downwardmost position to the forwardmost and uppermost position, in which position it is shown in FIG. 3. During this movement, the can feed wheel 23 feeds the can little, if any. However, inasmuch as the feed wheel does engage the under edge of the rim or flange of the can, it will move the can upwardly in an obvious manner causing the edge of the overlying cutter wheel 24 to pierce through the end of the can. As the feed wheel is raised and before the edge of the cutter wheel actually pierces the end of the can against the preselected pressure of the vertical compression spring 60, the forward end of the cutter carrier member 53 will be moved upwardly somewhat about the horizontal pivot pin 57, and, consequently, spring 60 will be further compressed. The strength of spring 60 should be such that the edge of the cutter wheel will be driven through the end of the can before the feed wheel arrives at its uppermost or raised position and before the cutter carrier member at its left end (again as viewed in FIG. 3) seats on the underlying portion of the body 20. If the can is extremely tough or if the spring is somewhat less resistant than is desired, nevertheless the engagement of the left end of the cutter carrier member with the body will halt upward movement of the cutter and the can eventually will be pierced. The strength of spring 60 must be adequate in any case to cause the rim or flange of the engaged can always to be sufficiently squeezed vertically between the teeth of the can feed wheel and the overlying groove 24b of the cutter wheel to assure feeding of the can in relation to the cutter wheel.

A minimum of frictional resistance within and between the component parts of the can opener is encountered during this initial piercing operation. Friction between the can feed wheel 23 and the plate 36 is held to a minimum because while the can feed wheel is being raised, it is also being rotated. The massive link construction, providing as it does exceptionally good axial parallelism between the link pivot 35 and the feed wheel shaft, and the arrangement used for axially mounting the can feed wheel, its drive shaft and other parts on the drive shaft, provides exceptionally good alignment, thereby reducing friction and resulting in easier operation of and longer life for the can opener.

The feed wheel is, of course, raised until it is in its uppermost position and substantially its forwardmost position when parts are in the positions shown in FIG. 11. To allow for manufacturing tolerances, the feed wheel shaft 25 can move a few thousandths of an inch forward from the position shown in FIG. 11, after which further forward movement is prevented by engagement of the bearing 28 with the forward end of slot 36a of plate 36. Thus, after the pawl 46 and cooperating parts have arrived at the positions shown in FIG. 11, further clockwise rotation of the can feed wheel drive shaft 25 will cause the pin 45 to escape from the notch formed by the detent 49a of the auxiliary pawl 49. It will be seen that the pin 52 prevents the pawl 46 from rotating further counterclockwise on its pivot screw 47. As the shaft continues to rotate clockwise, the pin 45 will strike the upper edge of the auxiliary pawl 49 causing it to rotate counterclockwise on its pivot rivet 50 against the tension of the spring 51 until the pin is again clear of the pawl. Once the pin is past the pawl 49, the latter will return to the position shown in FIG. 11 under the influence of spring 51. The shaft can, therefore, be continuously rotated clockwise as long as desired.

The lightness of the auxiliary pawl 49 as compared with the weight of the over-all pawl assembly and the relatively light tension of the spring 51 minimize the creation of undesirable clicking noises.

As previously stated, the tension of spring 51 also biases the pawl assembly toward pin 52.

It will be observed that due to the arcuate arrangement of the slots 36a, 37a and the relative position of the pawl assembly with respect to the feed wheel shaft 25a, the auxiliary pawl 49 exerts no binding effect on pin 45 when the feed wheel is in the raised position of FIG. 11. Therefore, negligible force is required to move the pin 45 downwardly out of the notch of the auxiliary pawl. This is in marked contrast to the relatively great amount of force required to effect escapement of other single action can openers of which I am aware.

The thrust inherent to the arrangement employed for mounting of the feed wheel 23 is such that the feed wheel will always remain in its uppermost and forwardmost position (as viewed in FIG. 3) whenever a can is engaged in the can opener and the rotation of the feed wheel is in the direction shown by the arrow, which is the direction of rotation during cutting of the lid from the can.

During the time that a can is engaged in the can opener and being cut, the under edge of the rim of the flange of the can will seat on the toothed periphery of the feed wheel and the base of the groove 24b of the cutter wheel will seat downwardly on the rim of the flange of the can at a point spaced rearwardly (for example, approximately one-eighth inch) of the axis of the can feed wheel. On the other hand, the can guide 71 will seat downwardly on the rim or flange of the can at a point spaced forwardly of the axis of the feed wheel (approximately one-half inch for example). The can guide 71 is preferably positioned at an elevation relative the feed wheel such as to maintain the engaged can with its axis rotated approximately two degrees counterclockwise from the vertical (when viewed as in FIG. 3). It will be noted that the can guide 71 imparts downward pressure only on the rim or flange of the can and that no part of this can guide bears against the side of the rim or flange of the can.

The projection 40c of the can guard and cover plate 40 maintaining the side wall of the engaged can at the preselected angle (in relation to the adjacent face of the feed wheel) for most efficient cutting of the end from the can and also serves to prevent the face of the feed wheel from mutilating conventional paper labels commonly affixed to the exterior of the cylindrical surface of the can. An angularity of approximately five degrees away from the plane of the face of the feed wheel has been found quite satisfactory for this purpose.

We we have earlier seen, the horizontal compression spring 62 serves to resiliently bias the overlapping face 24a of the cutter wheel toward the feed wheel. The spacing between the confronting faces of the cutter wheel and feed wheel should be sufficient as to permit passage of the can wall without interference. However, when a seam is encountered, the cutter wheel can move outwardly against the action of this spring because of the ability of the carrier to pivot slightly about the vertical fulcrum provided by link 54.

In describing the advantages in operation achieved by offsetting the cutter wheel so that its axis is substantially rearwardly of that of the can feed wheel and supporting it at the angular orientation relative to the adjacent face of the can feed wheel earlier described, some explanation of the problems in existing can openers has to be made.

Common practice has been to locate the cutter wheel axis directly above the axis of the can feed wheel, or even slightly forwardly thereof, the term "forwardly" being used in the sense of direction from which the end or lid of the engaged can is fed toward the cutter wheel. As a result, the cutter wheel actually has cutting engagement with the can lid at a point on the lid well in advance of the axis of the can feed wheel.

Due to the fact that the cutter wheel is inclined at a substantial angle from the vertical face of the can feed wheel, resistance of the lid of the can to cutting by the cutter wheel causes the inclined cutter wheel to impose an angled thrust to the lid and rim of the engaged can. Inasmuch as the face of the can feed wheel becomes, in effect, a fulcrum for the side wall of any engaged cylindrical can, it will be obvious that the angled thrust imparted to the lid and rim of such engaged can forwardly of the axis of the can will tend to cant the can on the feed wheel in such manner that the axis of the engaged can will be substantially forward of the axis of the can feed wheel. This condition is extremely undesirable, and various means have been employed toward the end of combatting same. However, to my knowledge at this time, a completely satisfactory solution has not been disclosed.

The most common means employed for coping with the above recited undesirable can canting condition is in the form of a fixed can guide positioned in front of the cutter wheel in such fashion that the rim or flange of an engaged can will laterally engage the end of the guide, the said guide preventing further canting of the can after engagement of the rim or flange of the engaged can with the guide. Obviously, such a fixed can guide can be correct for cans of but a single diameter. Accordingly, it is also common practice to compromise by selecting a can guide that is correct for cans of substantially intermediate diameter. With such a can guide, cans of smaller diameter are permitted to cant so that their axes are forward of the axis of the can feed wheel, and cans of larger diameter are positioned in such manner that their axes are rearward of the axis of the can feed wheel. Such a fixed can guide is even less suitable for use in the opening of so-called square cans having straight sides.

For maximum efficiency in the shearing of the lids or ends from any can, it is desirable to make the cut at a certain uniform distance inside the rim or flange of the can, irrespective of the diameter of the can. If the cutting takes place too close too the rim or flange of the can, slivers can be produced by scraping action of the cutter wheel and such condition usually "cramps" the can feed wheel into the side wall of the can to cause harder operation and less efficient traction and feeding of the can by the teeth of the can feed wheel. Conversely, if the cutting takes place too remote from the rim or flange of the can, absence of proximal support by the side wall of the can results in a "spongy" action, harder operation, tendency of the cutter wheel to "skip" when cutting, and the leaving of a "hinge" at point where end of the cut meets the point where the lid of can was initially pierced by the cutter wheel.

In the presently disclosed arrangement, the point actual cutting of the lid of the can takes place is approximately one-eighth inch forward of the axis of the can feed wheel, instead of approximately the five-sixteenths inch of conventional practice. Such repositioning of the cutter wheel materially reduces the leverage otherwise afforded the angled thrust for canting the engaged can on the can feed wheel. A second advantage accruing from repositioning of the cutter wheel in such manner is that actual cutting of the lid of the can takes place much closer to the highest point of the periphery of the can feed wheel, thereby providing more solid support for cutting.

That part of the conical portion 24a of the cutter wheel 24 that is forward of the axis of the said cutter wheel 24 substantially parallels the adjacent face of the can feed wheel 23. Inasmuch as the axis of the conical portion 24a is substantially rearward of the axis of the can feed wheel 23, and such paralleling part of the conical portion 24a bears against the inside of the rim or flange of the engaged can at a distance rearwardly of the axis of the can feed wheel 23 at least equal to the distance actual shearing of the lid of the can takes place forwardly of the axis of the can feed wheel, cans of any commercial diameters are uniformly guided and prevented from canting. This arrangement also functions with equal efficiency on so-called square cans having straight sides.

A third advantage accruing from such repositioning of the cutter wheel in such manner that actual cutting of the lid of the can takes place much closer to the highest point of the periphery of the can feed wheel is that variation in the distance inside the rim or flange of the can actual shearing takes place in cans of various diameters is negligible. Accordingly, to attain maximum cutting and can feeding efficiency on cans of various diameters, it is only necessary to produce cutter wheel 24 with its cutting edge periphery laterally positioned in relation to the conical portion 24a at such point that maximum shearing and can feeding efficiency are attained in the opening of a can of any selected diameter.

The foregoing advantages when coupled with the practically frictionless mounting of the cutter carrier 53 to the main body 20 and the action of the springs 60 and 62 all contribute to an effortless can opening operation which proceeds smoothly despite the presence of uneven portions of the can for approach and passage through the cutting zone of the thickened can seams. The unit is well adapted to handle cans having different can flange heights.

When cutting is completed, the operating crank 21 is turned in the reverse direction to release the can from the can opener. During cutting, the pawl assembly including pawl 46 is in the position shown in FIG. 11. Reverse rotation of the hand crank results in turning of shaft portion 25a counterclockwise as viewed in FIG. 11. Pin 45 thus engages detent 49a and the resulting reaction causes the shaft to be drawn along the slots 36a, 37a to the position illustrated in FIG. 12. Rearward and downward movement of the feed wheel shaft 25 to approximately the position shown in FIG. 12 is limited by engagement of the bearing 28 with the rearward end of the arcuate clearance slot 37a of plate 37. As earlier noted, this position corresponds to one in which the feed wheel is now below and separated from the cutter wheel. The can can now be removed.

If, when cutting is completed, the crank 29 is at some intermediate position rather than the one shown in FIG. 11, still reverse rotation will eventually bring pin 45 into engagement with the detent.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a can opener, the combination of a main body having a cavity therein, a link member, means supporting said link member in said cavity on opposite sides thereof for pivotal movement about a fixed pivot axis, a feed wheel shaft journaled in said link member for rotation about an axis parallel with said pivot axis, a feed wheel mounted on one end of said shaft, a crank arm carried by said shaft, a pawl assembly connected with said main body and having means cooperating with said crank arm and operable to effect shifting of said link member between two end positions within said cavity in response to rotation of the feed wheel shaft, a cutter member, and means connecting said cutter member with said main body and supporting same so that in one of said end positions, said feed wheel is in can cutting relationship with said cutter member.

2. A can opener as in claim 1 wherein said cavity is provided with opposite side closures having aligned arcuate openings formed with said pivot axis as the center of curvature and through which said feed wheel shaft extends, and a cover member adjacent one of said side closures and connected with said link member for pivoting therewith, said cover means having oppositely extending lobe portions which cover the portion of the arcuate opening in said one side closure not occupied by said feed wheel shaft at all positions of the feed wheel shaft axis between and including said two positions.

3. A can opener as in claim 1 wherein said cavity is provided with side closures having arcuate openings formed with said pivot axis as the center of curvature and through which said feed wheel shaft extends, said link member having oppositely extending axle portions which are journaled in aligned bearing surfaces in said closures.

4. A can opener as in claim 1 wherein said pawl assembly includes a main pawl member, pivoted to said main body and extending toward said crank arm, and an auxiliary pawl member pivoted to said main pawl member and resiliently biased with respect thereto, said crank arm having pawl engageable means thereon operable to be engaged and restrained by said auxiliary pawl member upon rotation of said crank arm in one direction, the auxiliary pawl so formed and mounted that rotation of the crank arm in the other direction displaces the auxiliary pawl relative to the main pawl each time the crank arm passes thereby.

5. The combination as in claim 4 wherein said main pawl member is so mounted that with the feed wheel shaft axis in said one position, said main pawl member bears against said pawl engaging means on the crank and tends to resist departure of said shaft from said one position.

6. In a can opener the combination of a main body having a cavity therein, a link member, means supporting said link member in said cavity for pivotal movement about a fixed axis between two end positions, a shaft journaled in said link member for rotation about an axis parallel with said pivot axis, a crank arm secured to said shaft externally of said cavity, a pawl assembly including a main pawl member pivoted at one end to said main body and having its other end adjacent the rotational path of said crank arm when said crank arm is in one of said end positions, an auxiliary pawl pivoted to said main pawl member near the other end thereof and having a detent, pawl engaging means carried by the crank arm and positioned to engage said detent upon rotation of said crank arm in one direction and to react with said crank arm and pawl assembly to effect shifting of said link member from said one end position to the other end position as rotation of the crank continues in said one direction, means connecting said auxiliary pawl to said main pawl member so that it is capable of resilient displacement from the path of said pawl engaging means upon rotation of said crank arm in the direction opposite said one direction while said shaft is in said one position, a feed wheel and a cutter wheel, one of said wheels carried by said body and the other by said link member, and so arranged with respect to each other that when said link is in said other end position, the wheels are in can cutting relationship.

7. A can opener as in claim 6 including an operating crank integral with said shaft.

8. In a can opener the combination of a main body, a rotary feed wheel, means supporting said feed wheel for movement in a path between two end positions, a cutter wheel carrier member, a cutter wheel mounted on said carrier member, means connecting said carrier member with said body for limited rocking movement of the carrier member about an axis parallel with the axis of the feed wheel and limited movement of the cutter wheel in a direction substantially parallel with the axis of the feed wheel, said rocking axis spaced laterally from the cutter wheel, and resilient means between said main body and carrier member and urging said carrier member at all times in a direction whereby to yieldably resist movement of said cutter wheel away from said feed wheel.

9. In a can opener, the combination of a main body, a rotary feed wheel, means supporting said feed wheel for movement in a path between two end positions, a cutter wheel carrier member, a cutter wheel mounted on said carrier member, means connecting said carrier member with said body for limited rocking movement of the carrier member about an axis parallel with the axis of the feed wheel, said rocking axis spaced laterally from the cutter wheel, resilient means between said main body and carrier member and urging said carrier member at all times in a direction whereby to yieldably resist movement of said cutter wheel away from said feed wheel, said carrier member and body provided respectively with spaced confronting surfaces at a location remote from said rocking axis, and a friction-inhibiting element between said surfaces with the opposite ends of said element adapted to engage respectively against said surfaces and to pivot at one of said ends during rocking movement while holding said surfaces at a substantially fixed spacing.

10. The combination as in claim 9 including means operable to confine said friction-inhibiting element to a position in which it extends endwise between said surfaces.

11. The combination as in claim 9 including means resiliently biasing the said element in an endwise direction.

12. In a can opener, the combination of a main body, a rotary feed wheel, means supporting said feed wheel from said main body for movement in a path between two end positions, a cutter wheel carrier member, a cutter wheel mounted on said carrier member, a pair of spaced link elements connected with and extending upwardly from said main body, said link elements aligned with one another on a line generally parallel with the axis of the feed wheel, means connecting said carrier member to the upper ends of said link members whereby to permit rocking movement of said carrier member relative to said main body about a first carrier pivot axis, one of said link elements being supported for limited rocking movement thereof relative said main body whereby to permit limited skewing of said first carrier pivot axis in a generally horizontal plane, and resilient means between said carrier member and main body and acting to yieldably stabilize said carrier member at one of the limit positions for each of said rocking movements.

13. In a can opener for cans having a top circumscribed by a can flange, the combination of a rotary feed wheel operable to engage the underside of a can flange and progressively feed same in a selected direction over the top of the feed wheel, a grooved cutter wheel, means supporting said cutter wheel so that its groove seats on the top of the can flange with the inside face of the cutter wheel on the inside of the flange and in partially overlapping relationship with the face of the feed wheel, the axis of the cutter wheel being skewed both horizontally and vertically with respect to the axis of the feed wheel so that that portion of the inside face of the cutter wheel which is in overlapping relationship with the face of the feed wheel is substantially parallel with said face of the feed wheel and the axis of the cutter wheel is laterally offset from the axis of the feed wheel in said selected direction.

References Cited by the Examiner
UNITED STATES PATENTS

| | | | |
|---|---|---|---|
| 1,939,349 | 12/33 | Holman | 30—4 |
| 2,186,668 | 1/40 | Curtis | 30—8 |
| 2,427,734 | 9/47 | McEntire | 30—9 |
| 2,522,383 | 9/50 | Lampl | 30—9 |
| 2,568,106 | 9/51 | Zumski | 30—9 |
| 2,806,280 | 9/57 | Grant | 30—9 X |
| 2,824,366 | 2/58 | Sarff | 30—4 |

WILLIAM FELDMAN, *Primary Examiner.*